July 21, 1959  W. MARTINMAAS, JR  2,895,268
SHARPENER FOR MOWER SICKLE SECTION
Filed Nov. 6, 1956  2 Sheets-Sheet 1
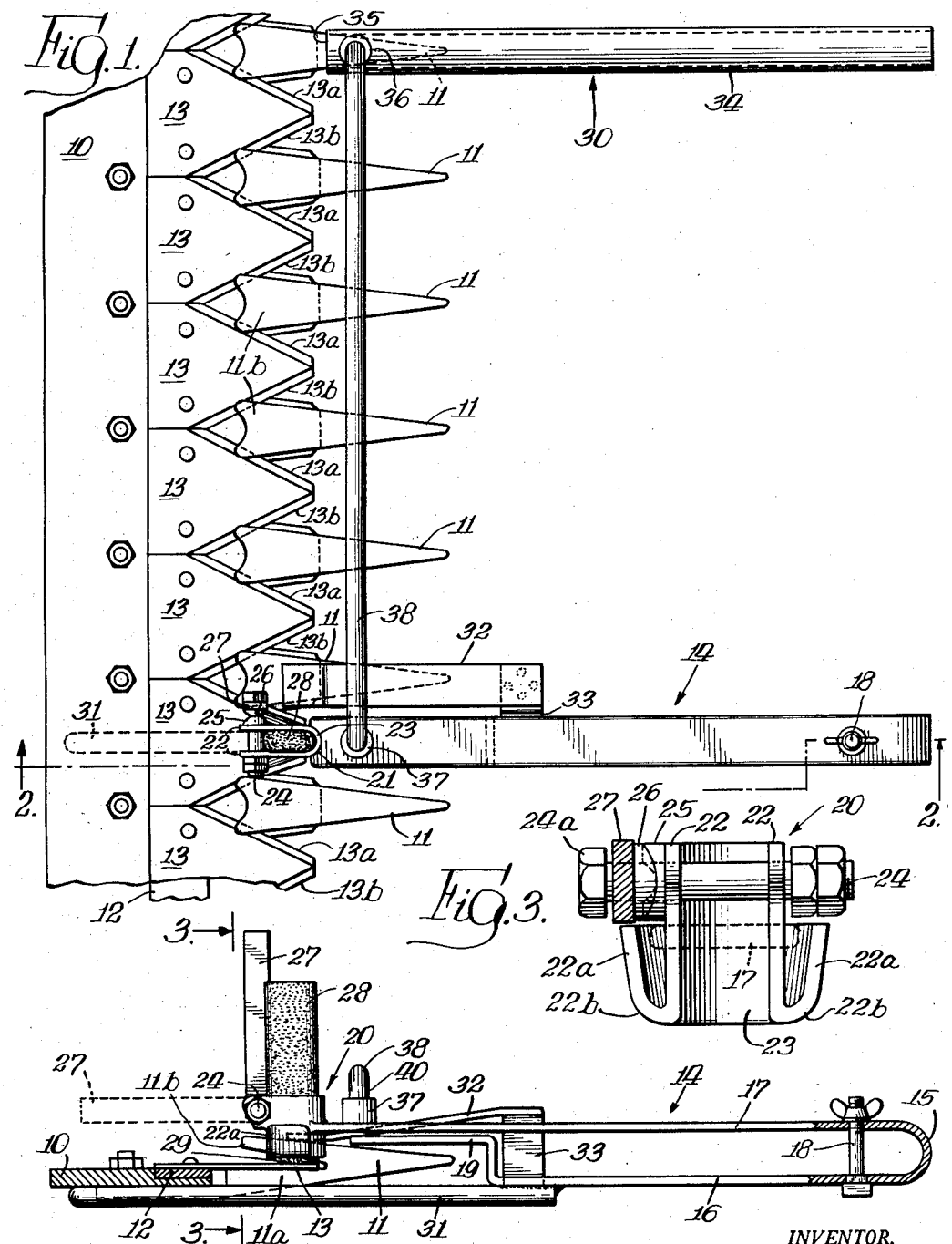
INVENTOR.
Werner Martinmaas, Jr.,
BY
Schroeder, Hofgren, Brady & Wegner
Attys.

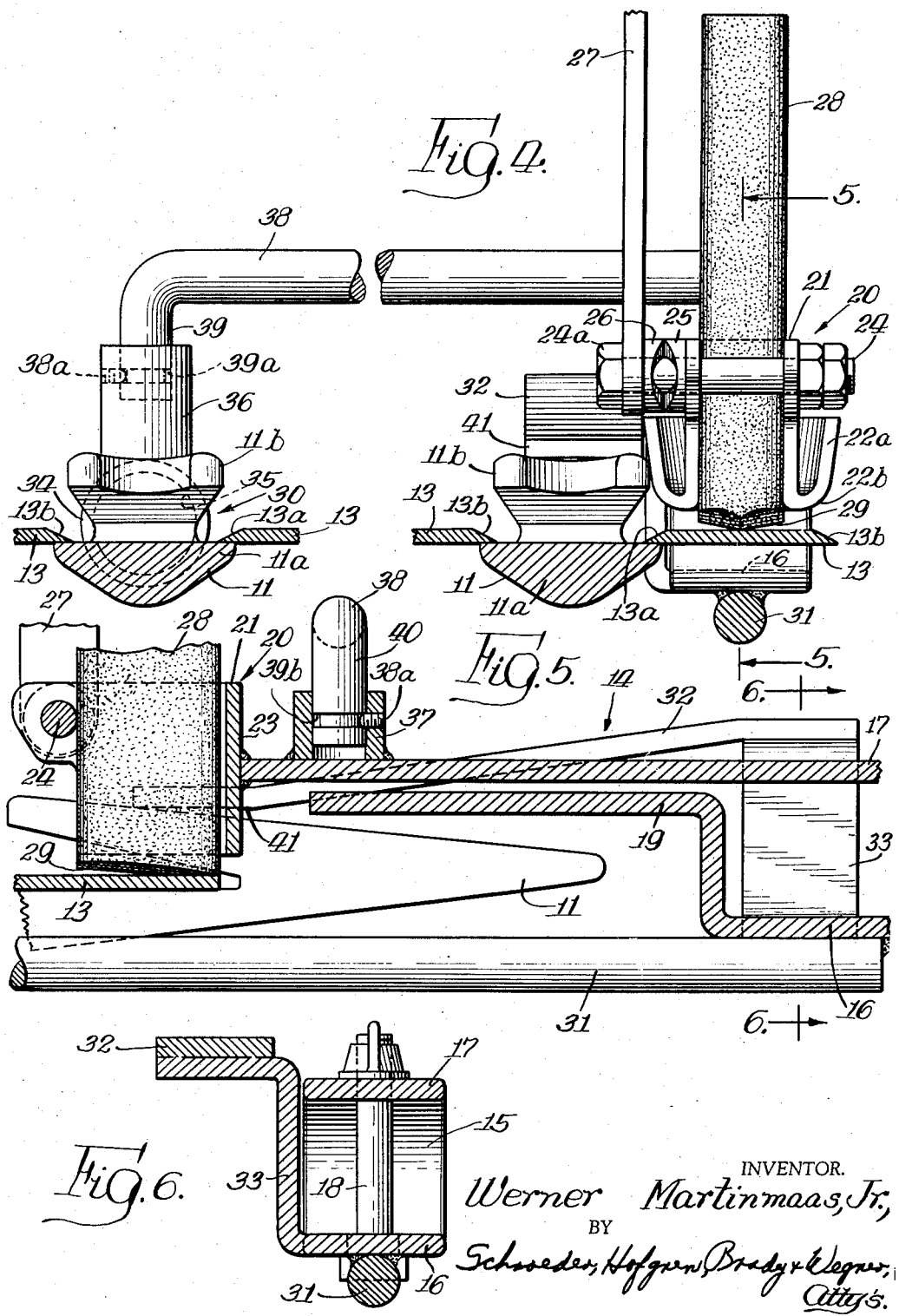

United States Patent Office 2,895,268
Patented July 21, 1959

2,895,268

SHARPENER FOR MOWER SICKLE SECTION

Werner Martinmaas, Jr., Miller, S. Dak.

Application November 6, 1956, Serial No. 620,762

12 Claims. (Cl. 51—250)

This invention relates to a sharpener for mower sickle sections, and in particular it relates to a sharpener which may be temporarily secured to the guard of a mower cutter bar to grind the sickle sections while they are in motion.

Conventional field mowers for farm use, of the type which are used for harvesting forage crops, have a frame including a long laterally extending fixed cutter bar which is provided with a plurality of bifurcated forwardly projecting guard members. An elongated mounting strap which surmounts the cutter bar serves as a base for a plurality of triangular sickle sections each of which is mounted between two adjacent forwardly projecting guard members and reciprocates between the upper and lower arms of said members. The sickle sections are triangular, and are sharpened along both edges.

These sickle sections rapidly become dull in use, and after a few hours of mower operation they should be sharpened if the mower is to operate with any efficiency. However, heretofore sharpening the sickle sections required that the carrier member with the attached sickle sections be dismounted to individually sharpen the sickle sections on a grinder or with a file or stone; and with the large number of sickle sections which is on each mower, and the difficulty of handling the carrier with the sickle sections on it, this is an extremely tedious job. In fact, it is so tedious that many farmers do not sharpen the sickle sections as often as they should, which results in poor mowing and incomplete harvesting of a forage crop.

The present invention consists of a sharpening device for the sickle sections of mowers by means of which they may be sharpened while on the cutter bar, with the normal reciprocating action of the driven, moving sickle sections serving to carry them across the grinding surface of a fixed grinding element.

The device has a fixed grinding member which is mounted in the upper of two jaws which are spring urged toward each other, and the unit has positioning means which is engageable with fixed portions of the mower cutter bar for locating the grinding surface of the grinding member between two adjacent guards and in the plane of reciprocation of a selected sickle section so that the mower cutter may be driven to move the selected sickle section back and forth with its cutting edges alternately in contact with the grinding surface.

The present device permits all the sickle sections on a mower to be sharpened in five or ten minutes; as against a minimum of about a half hour for removing the strap, sharpening the sections on a stone, and replacing the strap, under ideal conditions.

The invention is illustrated in a preferred embodiment in the accompanying drawings in which;

Fig. 1 is a fragmentary plan view of a mower cutter bar with the sharpener of the present invention in place thereon;

Fig. 2 is a section taken as indicated along the line 2—2 of Fig. 1;

Fig. 3 is a fragmentary sectional view on an enlarged scale taken substantially as indicated along the line 3—3 of Fig. 2, with the grinder element removed from its clamping means;

Fig. 4 is a section on an enlarged scale taken as indicated along the line 3—3 of Fig. 2;

Fig. 5 is a section taken as indicated along the line 5—5 of Fig. 4; and

Fig. 6 is a section taken as indicated along the line 6—6 of Fig. 5.

Referring to the drawings in greater detail, and referring first to Fig. 1, the numeral 10 represents the fixed cutter bar of a mower, which is provided with forwardly projecting, laterally spaced, rearwardly bifurcated guide members 11, each of which is seen in Fig. 2 to include a lower arm 11a secured to the underside of the cutter bar, and an upper arm 11b the rear end of which is spaced forward of, and above the plane of, said cutter bar. A carrier member, or strap 12, extends longitudinally of the cutter bar 10 and is reciprocable thereon to carry sickle sections 13 back and forth in the plane of the space between the lower and upper guard arms 11a and 11b. Each sickle section 13 is triangular in shape and has a point at the front from which diverging beveled cutting edges 13a and 13b extend toward the carrier member 12. The sharpening device of the present invention is for the purpose of sharpening both cutting edges of each of the sickle sections 13, while the sickle sections are reciprocating on the cutter bar 10.

As best seen in Figs. 2, 4 and 5, the sharpener includes a frame, indicated generally at 14, which is in the form of a horizontally elongated, U-shaped member with the base 15 of the U at the rear, and the lower and upper arms of the U forming respectively, a base member 16 and a grinder bar 17. The arms 16 and 17 are apertured near the base 15 of the U to receive a bolt and wing nut 18 by means of which the spring tension between the arms may be adjusted. The forward part of the base member 16 is provided with two right angle bends to afford a stop arm 19 limiting the downward movement of the grinder bar 17. The arms 16 and 17 of the U-shaped frame member 14 are so biased that the grinder bar 17 normally rests upon the stop 19, and the amount of force required to move the grinder bar upwardly off the stop 19 is determined by adjustment of the bolt and wing nut 18.

At the forward extremity of the grinder bar 17 is a grinder support means indicated generally at 20 including a clamping head 21 which is best seen in Fig. 1 to have a pair of arms 22 connected by an arcuate rear portion 23, and a bolt 24 extending transversely through the forward portions of the arms 22. At one side of the clamping head 21 is a fixed cam member 25, and rotatably mounted on the bolt 24 beneath a bolt head 24a is a movable cam member 26 which is provided with operating handle 27. A grinder element in the form of an elongated stone 28 is adjustably held between the arms 22 of the clamping head, and when the cam handle 27 is in the upright position of Figs. 2 and 4 the cams 25 and 26 coact to force the arms 22 into firm gripping engagement with the sides of the stone 28. In Fig. 3 the cam handle 27 is seen in section in its forwardly extending position (indicated by broken lines in Fig. 2) which rotates the movable cam 26 with respect to the fixed cam 25 and releases the clamping pressure on the stone 28. As best seen in Fig. 4, the stone has a grinding surface 29 at its lower end. When a stone is first used, the grinding surface 29 is slightly rounded, but with use it develops a very flat V shape and is forwardly inclined, as seen in Fig. 5, from the passage of the sickle sections 13 in sharpening contact with it.

The device of the present invention is provided with positioning means for properly locating the grinding surface 29 of the grinder element 28 in the plane of the laterally reciprocating sickle sections 13. The positioning means includes a lateral positioning device, or anchor member, indicated generally at 30, a lower positioning bar 31, which is welded to the forward portion of the base member 16 immediately to the rear of the stop 19 and extends forwardly below the grinder element 28, and an upper positioning bar 32, which is mounted alongside the grinder bar 17 on an upright bracket 33, the lower end portion of which is welded to the base member 16, as seen in Fig. 6.

As best seen in Figs. 1 and 4, the lateral positioning device 30 consists of a tube 34, the forward end of which provides a socket 35, which may be forced onto the conical outer end of a cutter guard 11 with the socket 35 frictionally engaging the guard. As best seen in Fig. 4, a boss 36 surmounts the tube 34, and surmounting the grinder bar 17 is a matching boss 37, so that a link 38 may have downturned end portions 39 and 40 received in the bosses 36 and 37, respectively. The downturned end portions of the link 38 are provided with annular recesses numbered 39a and 39b, respectively, to receive the inner ends of set screws 38a, so that the link 38 is pivotal with respect to each of the two bosses 36 and 37.

As best seen in Figs. 1, 2 and 5, the upper positioning bar 32 extends forwardly from its bracket 33 alongside the grinder bar 17 and is curved downwardly toward its forward end, which is bent to a generally horizontal plane, as seen at 41.

In the use of the device, the anchor tube 34 of the lateral positioning device 30 is engaged with a guard 11, which is remote from a selected sickle section 13, which is to be sharpened. With the sickle sections 13 of the mower reciprocating in the usual manner, the frame 14 is moved forwardly to bring the grinder element 28 between two guards 11, which flank the selected sickle section 13. The lower positioning bar 31 extends under the cutter bar 10, and the vertical distance from the stop 19 to the lower positioning bar 31 is such that the stone 28 may have its grinding surface 29 in the plane of movement of the selected sickle section. As seen in Fig. 4, the cutting edges 13a and 13b of the sickle sections are beveled inwardly from the bottom surface to the top surface of the sickle section; and with proper adjustment of the stone 28, as one of the beveled edges of the sickle section contacts the grinding surface 29 of the stone, it forces the grinder bar 17 upwardly off the stop 19 and the cutting edge formed by the bevel is dragged along the V-shaped grinding surface 29 of the stone 28. Thus, as the sickle sections reciprocate, the cutting edges 13a and 13b of a selected sickle section contact the grinding surface 29 of the stone alternately, so as to sharpen the cutting edges.

The link 38 is long enough that the anchor tube 34 may be swung from one side of the frame 14 to the other, for grinding the sickle sections at both ends of a cutter bar.

As best seen in Fig. 3, the arms 22 of the clamping head 21 are provided with outwardly and upwardly flaring stiffening and guide members 22a having arcuate guide surfaces 22b at their lower extremities so that if the lower positioning bar 31 and upper positioning bar 32 become bent and permit the grinder support means 20 to be too low in use, the curved cam faces 22b will act as cam guides for the sickle sections 13 and prevent any serious damage either to a sickle section or to the grinder support means.

It is clear from the foregoing description that the positioning means is a very important part of the present invention. The anchor tube 34 with the long pivoted link 38 serves to provide correct positioning of the grinder element 28 longitudinally of the cutter bar 10, while the lower positioning bar 31 and upper positioning bar 32 cooperate to establish the correct vertical position of the grinding surface 29 of the stone.

A selected sickle section 13 will make several passes across the grinding surface 29 in a few seconds, and this is adequate both to sharpen the sickle section and to remove any gums which may have formed on it from juices in the fodder crop which is being mowed.

The foregoing detailed description is given for clearness of understanding only and no unnecessary limitations are to be understod therefrom, as modifications will be obvious to those skilled in the art.

I claim:

1. A sharpener for the sickle sections of a mower which has a fixed cutter bar provided with a plurality of forwardly projecting, generally conical guard members and a plurality of sickle sections reciprocable on said cutter bar between said guard members, said sharpener comprising: a frame including a base member and a grinder member above and spring urged toward said base member; a fixed grinder element mounted on said grinder member and having a downwardly facing grinder surface at its lower end; means on said members establishing a minimum spacing there-between; an anchor member adapted to rotatably and frictionally embrace a guard member which is spaced laterally a substantial distance from a selected sickle section; a link pivotally connected to the frame and to said anchor member on parallel pivots which are in planes substantially perpendicular to the grinding surface, said link being adapted to locate the frame between two guard members when the anchor member is engaged with a third guard member; and positioning means engageable with fixed portions of the cutter bar to locate the grinding surface of said grinder element in the plane of reciprocation of said selected sickle section.

2. The device of claim 1 in which the positioning means includes a forwardly projecting lower positioning bar secured to the base member and engageable with the bottom of the mower cutter bar.

3. The device of claim 2 in which the positioning means also includes an upper positioning member secured to one side of the frame, said upper positioning member extending forwardly to a location where it may overlie the guard member immediately flanking the selected sickle section.

4. The device of claim 1 in which the anchor member is a forwardly open tubular member which is adapted to frictionally embrace a guard member.

5. A manually portable and manually manipulable sharpener for the sickle sections of a mower which has a fixed cutter bar assembly provided with a plurality of forwardly projecting generally conical guard members, and a plurality of sickle sections reciprocable on said cutter bar between said guard members in a transverse plane, said sharpener comprising: an elongated frame including a base member and a grinder member above and spring urged toward the base member, parts of said frame being entirely outside the area of the mower guard members when the sharpener is applied to a mower cutter bar assembly; an annular anchor member operatively connected to the frame to rotatably and frictionally embrace a guard member for fixing the longitudinal position of the frame on the mower, the operative connection between the anchor member and the frame permitting universal movement of the frame with respect to said guard member and said anchor member having an outwardly elongated portion extending outside of the area of the mower guard members to serve as a handle; a positioning bar on the base member and extending forwardly therefrom to frictionally engage the underside of the cutter bar for fixing the vertical position of the frame with respect to the sickle sections; a single grinder element on the grinder member which has a downwardly facing grinding surface at its lower end adapted to make sharpening contact with a single sickle section; and means on the frame establishing a minimum spacing between the base member and the grinder member, said anchor member, positioning bar and frame cooperating to facilitate the manual manipulation of the sharpener for grinding the sickle sections of a mower one at a time.

6. The device of claim 5 in which the anchor member is spaced laterally from the frame by a distance greater than the space between two adjacent guard members and the operative connection comprises a link pivotally connected to the anchor member and to the frame.

7. The device of claim 5 which includes an upper positioning member secured to one side of the frame and extending forwardly to a position where it may overlie the immediately adjacent guard member.

8. A manually portable and manually manipulable sharpener for the sickle sections of a mower which has a fixed cutter bar assembly provided with a plurality of forwardly projecting, generally conical guard members, and a plurality of sickle sections reciprocable on said cutter bar between said guard members in a transverse plane, said sharpener comprising: a frame including a base member and a grinder member above and spring urged toward the base member; an anchor member adapted to rotatably and frictionally embrace a guard member which is spaced laterally a substantial distance from the frame; a link pivotally connected to the frame and to the anchor member on parallel pivots; positioning means on the frame engageable with the mower for fixing the vertical position of the frame with respect to the plane of the sickle sections; a grinder element on the grinder member which has a downwardly facing grinding surface at its lower end in a plane substantially perpendicular to said pivots; and means on the frame establishing a minimum space between the base member and the grinder member.

9. The device of claim 8 in which the positioning means includes positioning elements to engage the bottom and the top of the cutter bar assembly.

10. A manually portable and manually manipulable sharpener for the sickle sections of a mower which has a fixed cutter bar provided with a plurality of forwardly projecting, generally conical guard members and a plurality of sickle sections reciprocable on said cutter bar between said guard members, said sharpener comprising: a frame comprising upper and lower leaf spring arms secured together at the rear and having their front ends biased toward each other; a rigid positioning bar secured to and extending forwardly from the lower spring arm to engage the underside of a mower cutter bar; grinder support means on the upper leaf spring; a fixed upright grinder element removably mounted in said support means with a grinding surface at its lower end; means establishing a minimum space between the grinding surface and said positioning bar; a hollow, tubular anchor member adapted to rotatably and frictionally embrace a guard member which is spaced laterally a substantial distance from a selected sickle section; and a link pivotally connected to said anchor member and to the frame on parallel pivots which are in planes substantially perpendicular to the plane of the grinding surface, said positioning bar and said anchor member cooperating to position the grinding surface of the grinder member between two adjacent guards and in the plane of reciprocation of a selected sickle section.

11. A manually portable and manually manipulable sharpener for the sickle sections of a mower which has a fixed cutter bar assembly provided with a plurality of forwardly projecting, generally conical guard members, and a plurality of sickle sections reciprocable on said cutter bar between said guard members in a transverse plane, said sharpener comprising: a narrow frame which is adapted to be positioned between two guard members and extend outwardly to provide a handle portion which is outside the ends of said members when the sharpener is applied to a mower; an anchor member adapted to rotatably and frictionally embrace a guard member which is spaced laterally a substantial distance from the frame; a link pivotally connected to the frame and to the anchor member on parallel pivots; a single grinder element on the frame at the end opposite the handle portion, said grinder element having a downwardly facing grinding surface adapted to make sharpening contact with a single sickle section, said surface being in a plane substantially perpendicular to said pivots; and integral positioning means on the frame engageable with the mower to establish the vertical position of the grinding surface with respect to the plane of said single sickle section, said anchor member, frame and positioning means cooperating to facilitate manual manipulation of the sharpener for grinding the sickle sections of a mower one at a time.

12. A manually portable and manually manipulable sharpener for the sickle sections of a mower which has a fixed cutter bar assembly provided with a plurality of forwardly projecting, generally conical guard members, and a plurality of sickle sections reciprocable on said cutter bar between said guard members in a transverse plane, said sharpener comprising: a narrow frame which is adapted to be positioned between two guard members and extend outwardly to provide a handle portion which is outside the ends of said members when the sharpener is applied to a mower; an annular anchor member operatively connected to the frame to rotatably and frictionally embrace a guard member for fixing the longitudinal position of the frame on the mower, the operative connection between the anchor member and the frame permitting universal movement of the frame with respect to said guard member, and said anchor member having an outwardly elongated portion extending outside of the area of the mower guard members to serve as a handle; a single grinder element on the frame at the end opposite the handle portion, said grinder element having a downwardly facing grinding surface adapted to make sharpening contact with a single sickle section; and integral positioning means on the frame engageable with the mower to establish the vertical position of the grinding surface with respect to the plane of said single sickle section, said anchor member, frame and positioning means cooperating to facilitate manual manipulation of the sharpener for grinding the sickle sections of a mower one at a time.

References Cited in the file of this patent

UNITED STATES PATENTS

| | | |
|---|---|---|
| 406,739 | Kellogg | July 9, 1889 |
| 434,289 | McQuaid | Aug. 12, 1890 |
| 446,803 | Watson | Feb. 17, 1891 |